United States Patent [19]

Kagami et al.

[11] Patent Number: 5,255,253
[45] Date of Patent: Oct. 19, 1993

[54] APPARATUS AND METHOD FOR CONTROLLING THE VELOCITY OF A DISK STORAGE HEAD

[75] Inventors: Naoyuki Kagami, Fujisawa; Hiroaki Kubo, Atsugi; Keiichi Okada, Kanagawa; Makoto Takekoshi, Yokohama, all of Japan

[73] Assignee: International Business Machines Corporation, Armonk, N.Y.

[21] Appl. No.: 772,725

[22] Filed: Oct. 7, 1991

[30] Foreign Application Priority Data

Oct. 3, 1990 [JP] Japan .................................. 2-263981

[51] Int. Cl.⁵ .............................................. G11B 7/00
[52] U.S. Cl. .................................. 369/44.28; 369/32; 360/78.06
[58] Field of Search ................ 369/44.27, 44.28, 44.29, 369/32, 44.25, 44.35, 44.36; 360/77.06, 73.08, 73.09, 78.06

[56] References Cited

U.S. PATENT DOCUMENTS

| | | | |
|---|---|---|---|
| 4,855,977 | 8/1989 | Getreuer et al. | 369/44.28 |
| 4,899,234 | 2/1990 | Genheimer | 369/78.06 |
| 4,914,725 | 4/1990 | Belser et al. | 360/77.06 |
| 5,033,037 | 7/1991 | Yanagi | 369/44.29 |
| 5,038,333 | 8/1991 | Chow et al. | 369/44.29 |
| 5,046,058 | 9/1991 | Shimonau | 369/44.28 |
| 5,048,001 | 9/1991 | Moriya et al. | 369/44.28 |
| 5,050,146 | 9/1991 | Richsels et al. | 369/44.28 |
| 5,088,075 | 2/1992 | Yokota | 369/44.28 |
| 5,101,391 | 3/1992 | Ishii et al. | 369/44.29 |

Primary Examiner—Aristotelis Psitos
Assistant Examiner—Nabil Hindi
Attorney, Agent, or Firm—M. W. Schecter; D. A. Shifrin

[57] ABSTRACT

In this invention, a driving circuit for moving a head in the radial direction on the recording surface of a disk is coupled to a velocity detecting circuit for detecting the velocity at which the head moves. A velocity profile is provided for storing information on the target velocity of the head. A driving signal generating circuit is coupled to the velocity profile and the velocity detecting circuit for comparing a signal from the velocity detecting circuit with a signal from the velocity profile. The driving signal generating circuit outputs a driving signal to the driving circuit based on the result of the comparison. A controller is coupled to the driving circuit for measuring a time required for moving the head a predetermined distance at a predetermined reference value, and modifying the driving signal based on the result of the comparison. Scatter in feedback quantities or fluctuation in the driving signal during velocity control is thereby corrected.

4 Claims, 6 Drawing Sheets

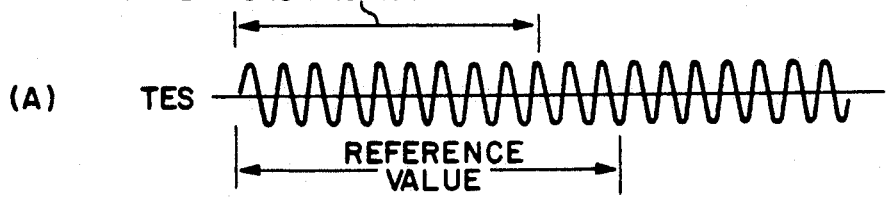
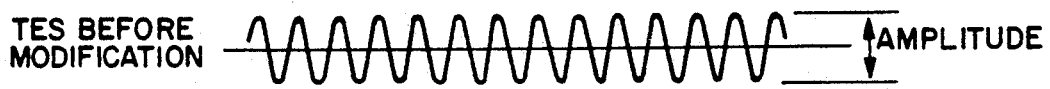
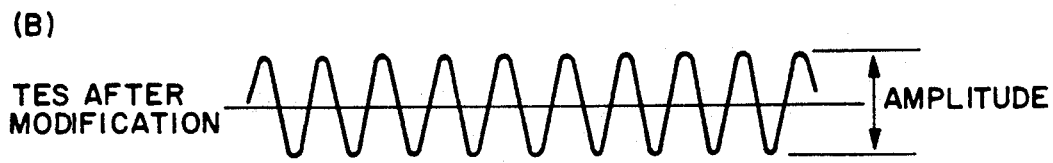
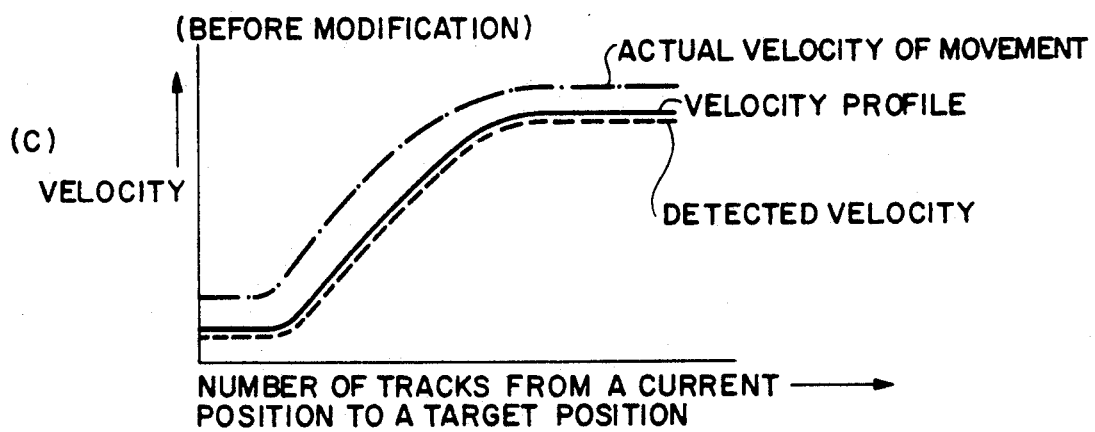
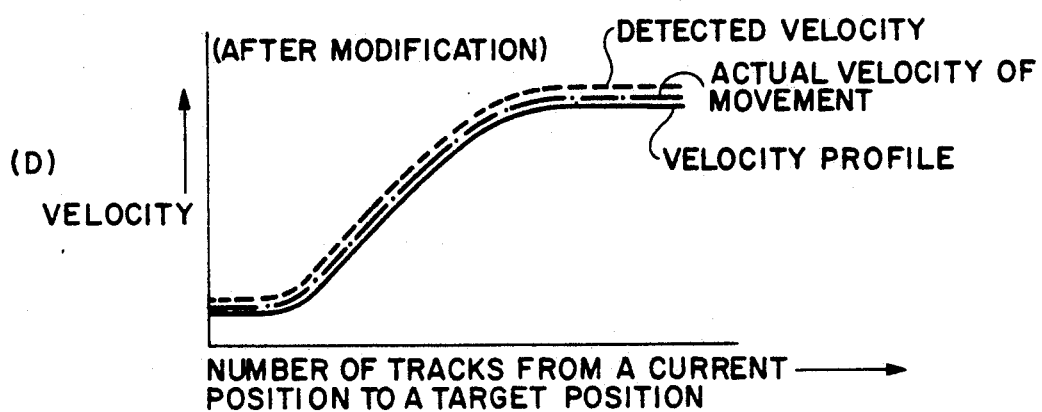
FIG. 5

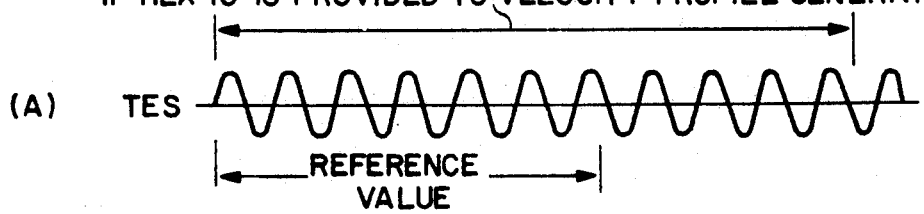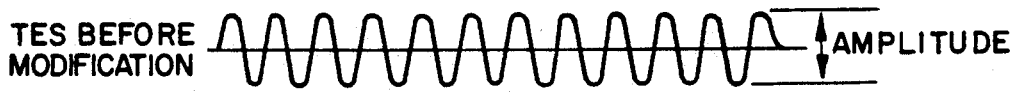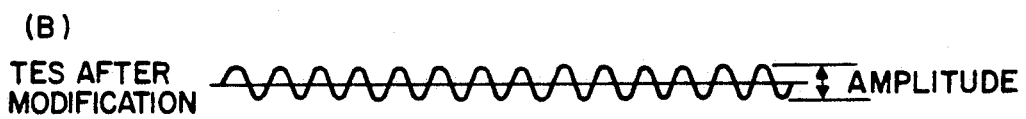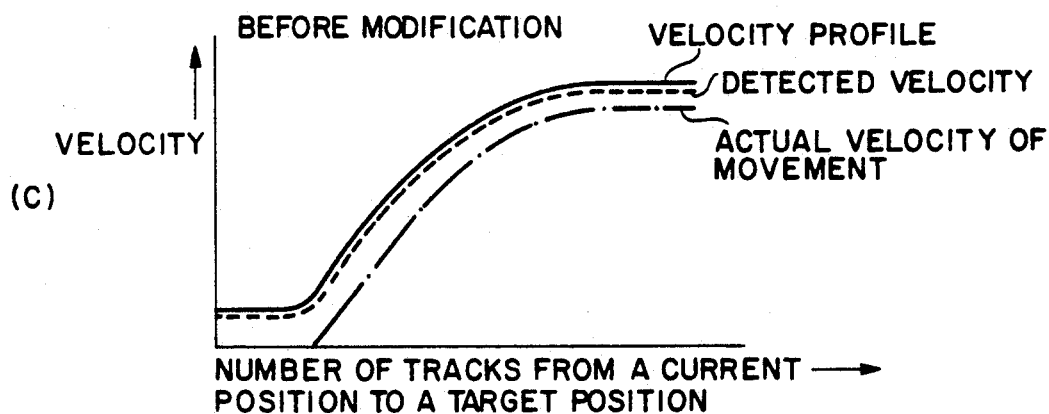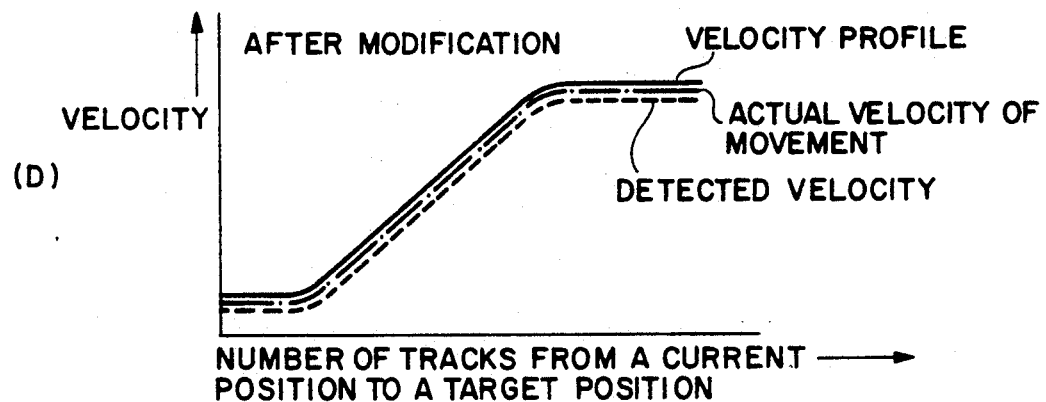
FIG. 6

APPARATUS AND METHOD FOR CONTROLLING THE VELOCITY OF A DISK STORAGE HEAD

BACKGROUND OF THE INVENTION

1. Field of the Invention

This invention relates to a disk storage apparatus, and is particularly concerned with a feature for controlling the velocity of a head during a seek operation.

2. Description of the Related Art

During a seek operation, a laser beam moves in the radial direction of a disk while crossing tracks. The velocity of the laser beam during the seek operation is detected based on a tracking error signal (TES) that indicates a deviation of the beam from the track center. The laser beam velocity control is usually performed so that the beam can be moved at an ideal velocity according to a distance to a target position.

In such velocity control, velocity information obtained from differentiating a TES is compared to a velocity profile that indicates an ideal velocity according to a distance to a target position. The velocity of a laser beam may be controlled so that a difference as the result of the comparison becomes zero. The velocity profile has a structure in which the beam reaches a target position in a short time and decelerates so as to surely shift to a track following operation at the target position. FIG. 3 provides an example indicating the relationship between a distance from a current position to a target position and a target velocity.

However, if the velocity information is obtained from the average of the amplitude of a signal obtained from differentiating the TES, the value of the velocity information shows a variation due to a shape of a track guide groove on the optical disk as well as scatter in circuit constants. Moreover, even if the velocity information is obtained independently of the differentiation of the TES, the value of the velocity information changes due to scatter in circuit constants. Accordingly, even if the velocity of the beam is controlled so that a difference between a detected velocity and an ideal velocity from the velocity profile becomes zero, the velocity at which the beam moves may be higher or lower than the ideal velocity as the case may be.

FIG. 7 shows values of detected velocity for values from the velocity profile, and the actual velocity at which the beam moves in a case where even if the velocity is controlled so that a difference between the detected velocity and the ideal velocity from the velocity profile becomes zero, the actual velocity of the movement of the beam becomes higher than the ideal velocity assumed theoretically. In this case, as is obvious from the FIG. 7, even if the beam reaches a target position, the beam is not satisfactorily decelerated. Thus the beam cannot shift to a track following operation at the target position.

FIG. 8 shows values of detected velocity for values from the velocity profile, and the actual velocity at which the beam moves in a case where even if the velocity is controlled so that a difference between the detected velocity and the ideal velocity from the velocity profile becomes zero, the actual velocity of the movement of the beam becomes lower than the ideal velocity assumed theoretically. In this case, as is obvious from FIG. 8, the velocity of the movement of the beam from the optical head becomes zero before a target track position is reached and thus that target track cannot be reached during one seek operation.

Further, even if the velocity information itself precisely shows an actual velocity, a driving signal generated based on the precise velocity information may fluctuate due to a large variety of circuit constants and cause a similar problem. Such a problem may be caused not only in an optical disk drive apparatus but in a magnetic disk drive apparatus.

SUMMARY OF THE INVENTION

An object of this invention is to control the velocity of a head during a seek operation in a disk storage apparatus with a high accuracy, independently of scatter in circuit constants and the variation in the shapes of grooves on an optical disk, so as to avoid failure in a shift from the seek operation to a track following operation or in the seek operation.

In this invention, a driving circuit for moving a head in the radial direction on the recording surface of a disk is coupled to a velocity detecting circuit for detecting the velocity at which the head moves. A velocity profile is provided for storing information on the target velocity of the head. A driving signal generating circuit is coupled to the velocity profile and the velocity detecting circuit for comparing a signal from the velocity detecting circuit with a signal from the velocity profile and outputting a driving signal to the driving circuit based on the result of the comparison. A controller is coupled to the driving circuit for measuring a time required for moving the head a predetermined distance at a predetermined reference value, and modifying the driving signal based on the result of the comparison. Scatter in feedback quantities or fluctuation in the driving signal during velocity control is thereby corrected.

The foregoing and other objects, features and advantages of the invention will be apparent from the following more particular description of the preferred embodiment of the invention, as illustrated in the accompanying drawing.

BRIEF DESCRIPTION OF THE DRAWING

FIG. 5(A) is a chart showing a waveform of a TES during a constant-velocity seek operation in said embodiment in the case where an actual velocity of movement is higher than in detected velocity information.

FIG. 5(B) are charts showing waveforms of a TES before and after correction.

FIG. 5(C) and FIG. 5(D) are charts showing velocity profiles for a distance from a current position to a target position during a seek operation before and after correction, velocity information detected based on a TES, and the actual velocity of movement of a head.

FIG. 6(A) is a chart showing a waveform of a TES during a constant-velocity seek operation in said embodiment in the case where an actual velocity of movement is lower than in detected velocity information.

FIG. 6(B) are charts showing waveforms of a TES before and after correction.

FIG. 6(C) and (D) are charts showing velocity profiles for a distance from a current position to a target position during a seek operation before and after correction, velocity information detected based on a TES, and the actual velocity of movement of a head.

DESCRIPTION OF THE PREFERRED EMBODIMENT

Figure 1:
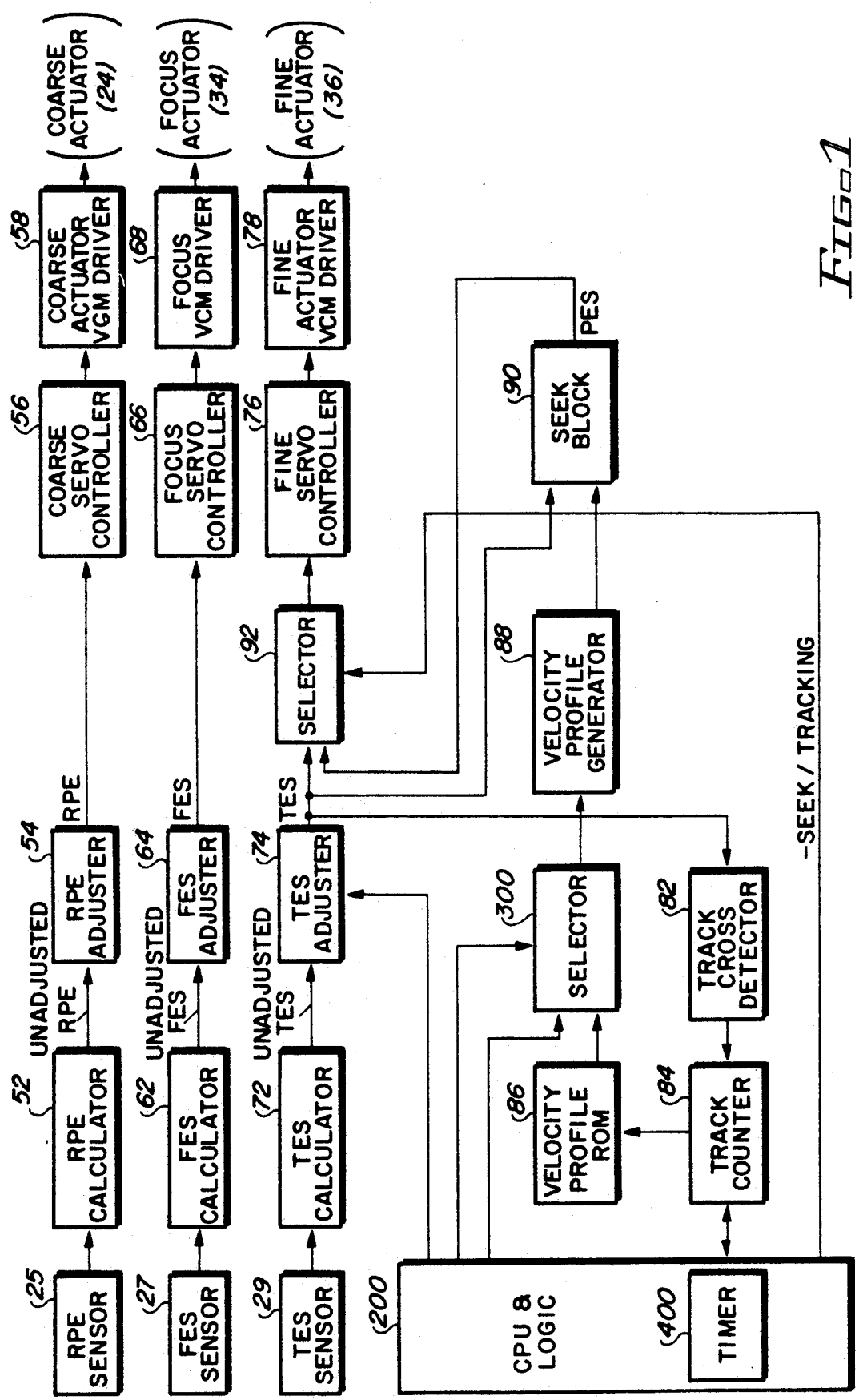
FIG. 1 is a block diagram showing one part of an embodiment of this invention concerning a disk storage apparatus.

In the following, the preferred embodiment of the invention is described by reference to the drawing.

Figure 2:
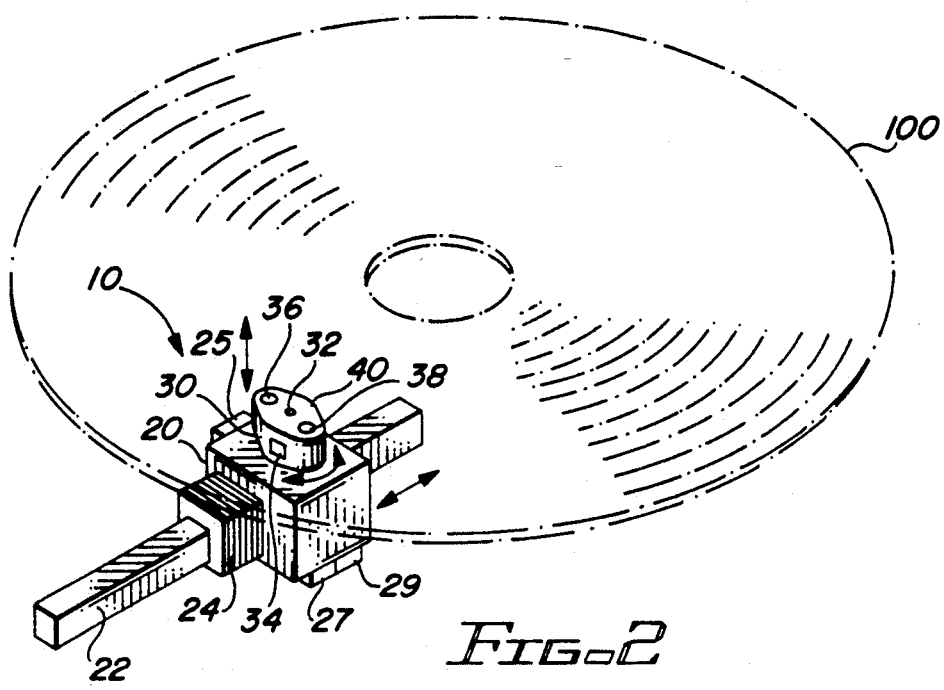
FIG. 2 is a perspective view showing another part of said embodiment.

FIG. 2 shows a part of an embodiment of a disk storage apparatus concerning this invention. In the figure, an optical head 10 is composed of a coarse actuator 20 and a fine actuator 30. The coarse actuator 20 is supported by a rail 22 so that it can move freely in the radial direction of an optical disk 100 (in the direction of a seek operation), and is driven in the direction of the seek operation by a coarse actuator VCM (Voice Coil Motor) 24.

The fine actuator 30 is supported by the coarse actuator 20 through a shaft 32 so that is can move in the focusing and the tracking directions. The fine actuator 30 is driven in the focusing direction and in the tracking direction by a focus VCM 34 and a tracking VCM 36, respectively. The fine actuator 30 has an objective lens 38 fixed from which a laser beam 40 is projected onto the optical disk 100.

Also, the coarse actuator 20 is provided with a relative position error (RPE) detecting sensor 25, a focus error signal (FES) detecting sensor 27, and a tracking error signal (TES) detecting sensor 29. The RPE detecting sensor 25 which is, for example, a photo sensor having two sensitive parts that are split, detects the quantity of a relative deflection (rotational deflection from a neutral position) of the fine actuator 30 from the coarse actuator 20. The FES detecting sensor 27 which is, for example, a photo sensor having four sensitive parts that are split, detects a positional difference of a spot of the laser beam 40 from a focusing point on the optical disk 100. The TES detecting sensor 29 which is, for example, a photo sensor having two sensitive parts that are split, detects a positional deviation of a spot of the laser beam 40 from the track center on the optical disk 100.

FIG. 1 shows another part of said embodiment. In FIG. 1, an output of the RPE detecting sensor 25 is inputted to a RPE calculator 52. The RPE calculator 52, if the RPE detecting sensor 25 is, for example, a photo sensor having two split sensitive parts, calculates a difference between detecting signals from two photo-sensitive parts and then outputs an unadjusted or raw RPE. When the gain and the offset of the raw (unadjusted) RPE is adjusted by a RPE adjuster 54, an adjusted RPE can be obtained and the adjusted RPE is provided to a coarse servo controller 56 and a tracking servo controller 76.

The RPE, after low-pass filtering and compensation for phase progress by the coarse servo controller 56, is provided to a coarse actuator VCM driver 58. The VCM driver 58 provides a driving current according to the amplitude and the sign of the RPE, that is, the quantity and the direction of a deflection of the fine actuator 30 to the coarse actuator 20 is provided to the coarse actuator VCM 24.

An output of the FES detecting sensor 27 is inputted to a FES calculator 62. The FES calculator 62, for example, if the FES detecting sensor 27 is a photo sensor with four split sensitive parts, calculates a difference between a sum of detecting signals from a pair of two photo sensitive parts diagonally positioned to each other and a sum of detecting signals from another pair of two photo-sensitive parts diagonally positioned to each other and then outputs an unadjusted or raw FES. When the offset of the raw (unadjusted) FES is adjusted by a FES adjuster 64, an adjusted FES can be obtained. The FES thus obtained is provided to a focus servo controller 66.

The FES, after low-pass filtering and compensation for phase progress by the focus servo controller 66, is provided to a focus VCM driver 68 from which driving current according to the amplitude and sign of the FES, that is, the positional deviation and the direction of a spot of the laser beam 40 from the focus point is provided to the focus VCM 34.

An output of the TES detecting sensor 29 is inputted to a TES calculator 72. The TES calculator, for example, if the TES detecting sensor 29 is a photo sensor having two split sensitive parts, calculates a difference between detecting signals from a pair of two photo sensitive parts to output an unadjusted or raw TES. When the gain and the offset of the raw (unadjusted) TES are adjusted by the TES adjuster 74, an adjusted TES can be obtained and the TES thus obtained is provided, through a first selector 92, to the tracking servo controller 76, and a tracking VCM driver 78 providing a driving signal for tracking to the tracking VCM 36.

The TES adjuster 74 is connected to a servo system controller (CPU plus logic circuit) 200 used as control means and the amplitude of an unadjusted or raw TES can be varied based on a signal from the controller 200 during a seek operation.

The adjusted TES is inputted to a track cross detector 82 in which the number of times when the optical head 10 (that is, a beam spot) moves across tracks is detected based on a waveform of the TES and from which the result of detection is provided to a track counter 84. At the start of the seek operation, the servo system controller 200 provides a value indicating a track distance from a current position to a target position to the track counter 84. A value contained in the track counter 84 is decreased by subtraction each time the optical head 10 moves across a track during the seek operation.

Figure 3:
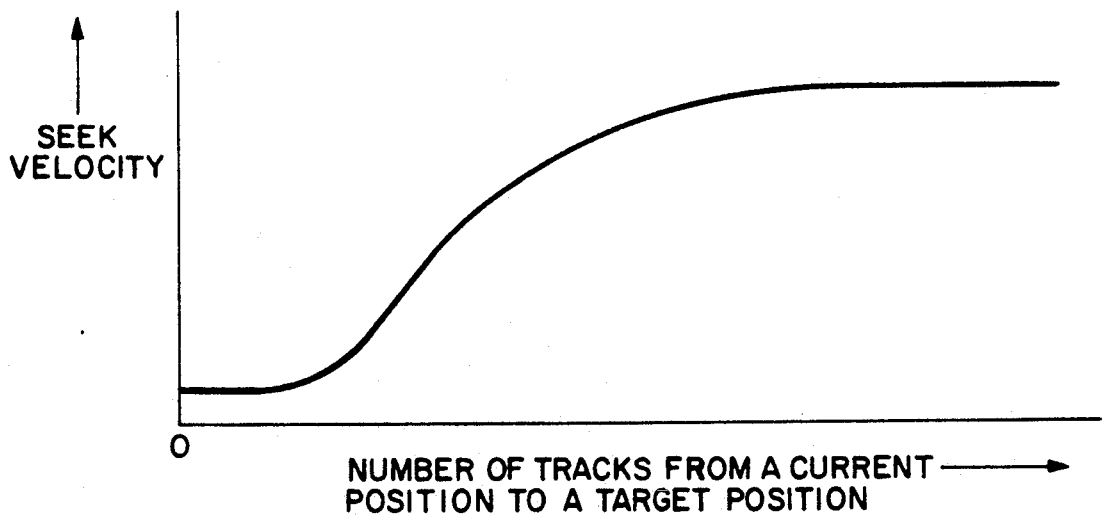
FIG. 3 is a graph showing a velocity profile of said embodiment.

The controller 200 is provided with a velocity profile ROM 86, used as a velocity profile, in which information, for example, the relation between a track distance from the current position to the target position and a desired velocity (a target velocity), as in FIG. 3, used for controlling the seek velocity, is stored. When information about the current position is provided based on the value of the track counter 84, the velocity profile ROM 86 outputs a desired velocity, represented as a digital value, at the current position, through a second selector 300, to a velocity profile generator 88 in which the digital value is converted to an analogue value to output the analogue value to a seek block 90 used as driving signal generating means. The velocity profile generator 88 is connected also to the controller 200 through the second selector 300 which determines, based on a control signal from the controller 200, whether a desired digital velocity provided to the velocity profile generator 88 is provided from the velocity profile ROM 86 or directly from the controller 200. The controller 200 is provided with an internal timer 400 for measuring time during a seek operation.

The seek block 90 compares the value obtained from the velocity profile generator 88 with the current velocity information conveyed by the TES to produce a positioning error signal (PES) which is an integrated value of the result of the comparison. The PES is provided to the first selector 92 to which the TES is provided as well. In seek operation mode, the selector 92 provides the PES to the fine tracking servo controller 76. In seek operation mode, the selector 92 may provide PES to not only the fine tracking servo controller 76 but the coarse servo controller 56.

Hereupon, the TES adjuster 74, the velocity profile generator 88, the selector 300, controller 200, and the time measuring timer 400 constitute automatic seek-velocity modifying means.

Figure 4:
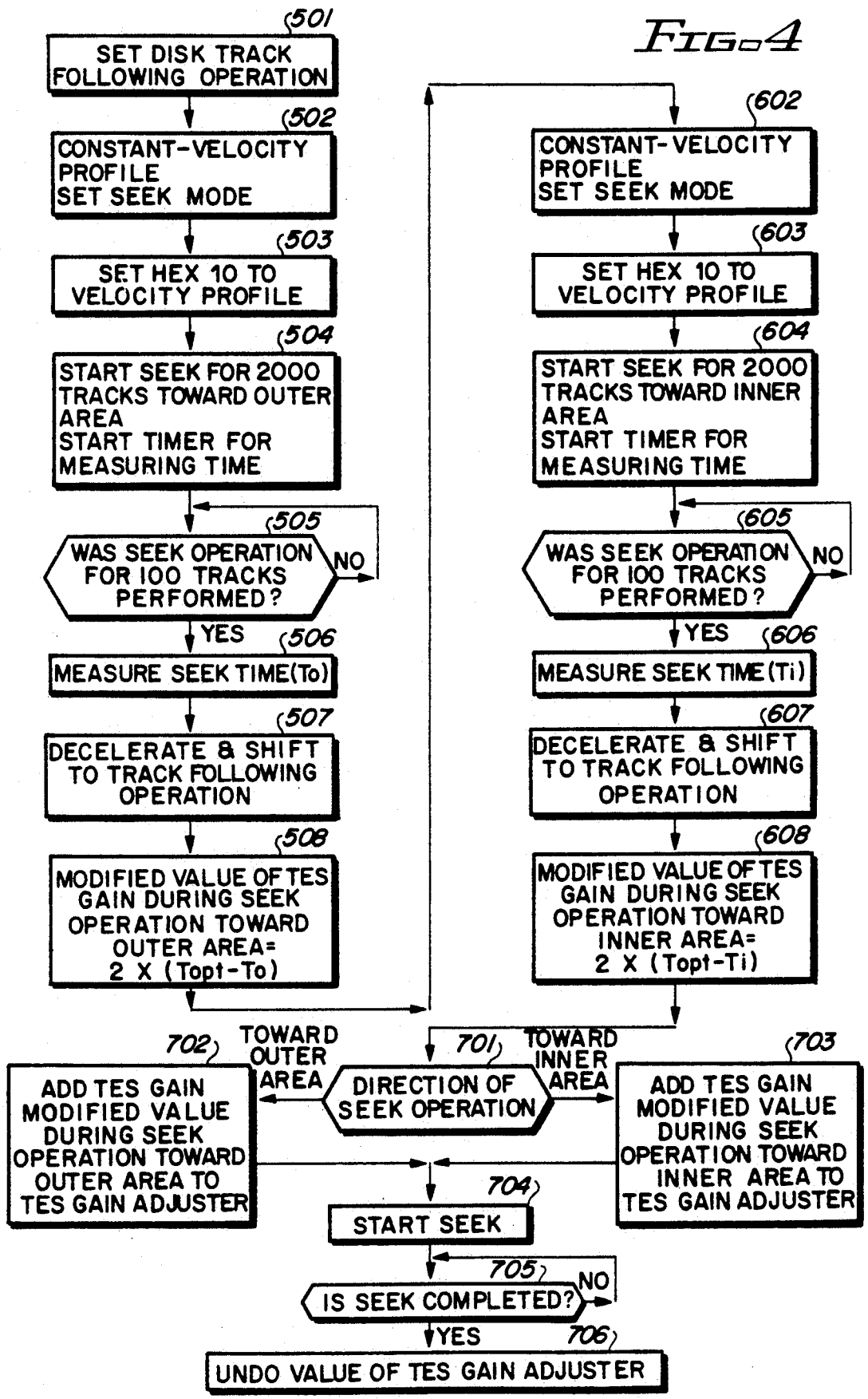
FIG. 4 is a flowchart showing a series of operations during a seek operation in said embodiment.
Figure 7:
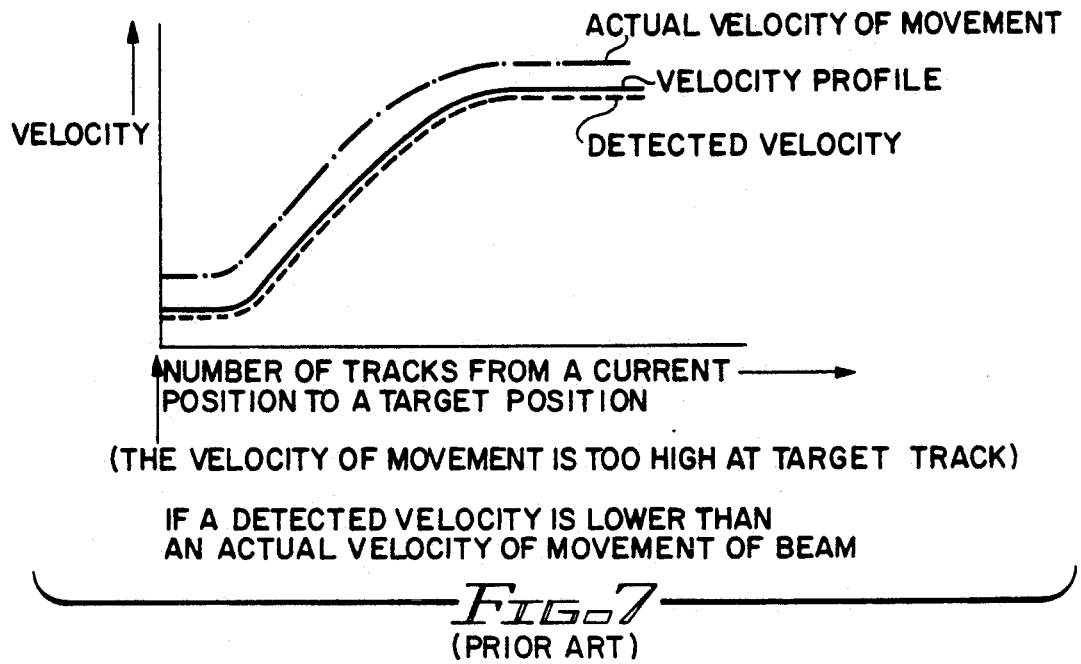
FIG. 7 is a graph, in a prior art, showing the values of detected velocity and an actual velocity of the movement of a head in comparison with a velocity profile in the case where an actual velocity of movement is higher than in velocity information.
Figure 8:
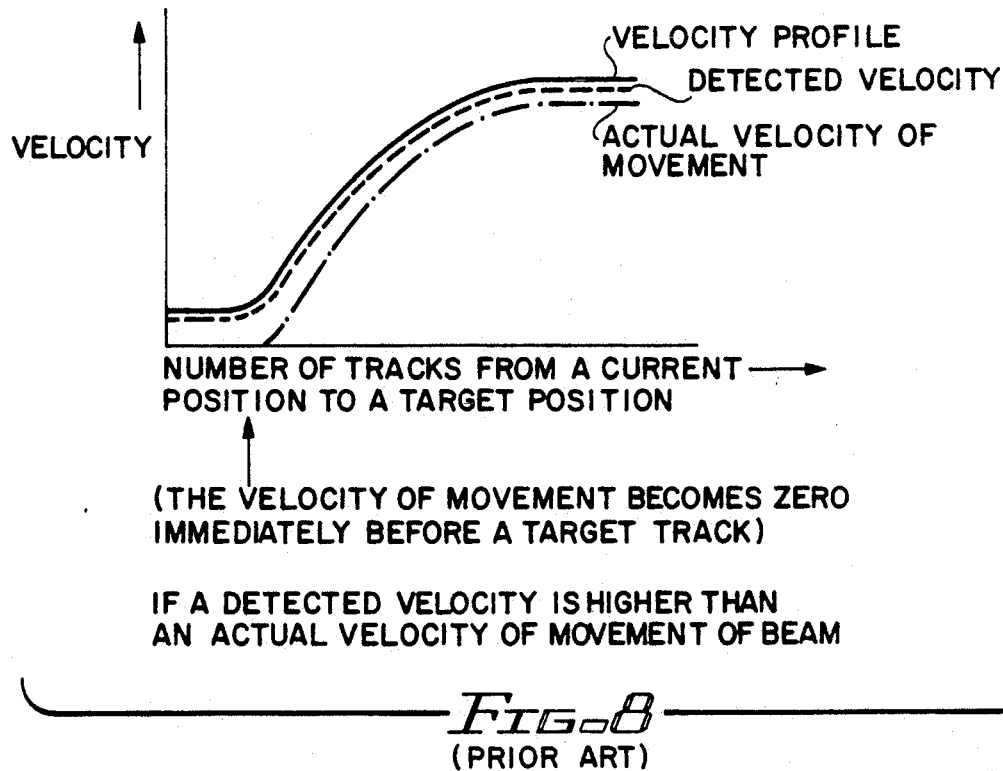
FIG. 8 is a graph, in a prior art, showing the values of detected velocity and an actual velocity of the movement of a head in comparison with a velocity profile in the case where an actual velocity of movement is lower than in velocity information.

In the following, a method for modifying velocity control in the embodiment is described referring to a flowchart shown in FIG. 4.

After the optical disk 100 is set in a drive apparatus and changed to track following operation mode (Processing block 501), the second selector 300, is controlled by a switching signal from the controller 200, setting the optical disk 100 to a constant velocity seek mode (Processing block 502). The controller 200 sets a predetermined value, for example, Hex 10 to the velocity profile generator 88 (Processing block 502) and starts a seek operation for a predetermined number of tracks (for example, 2000 tracks) toward the outer area of the optical disk 100 (Processing block 504). The timer 400 starts at the same time as the seek operation, and the controller 200 determines if the content of the track counter 84 has been decreased. A seek time required for the seek operation for 100 tracks is measured by the timer 400 (Processing block 506). Then a modified value of the gain of the TES during the seek operation toward the outer area of the optical disk 100 is calculated by a predetermined equation so that if said seek time $T_o$ is greater than a target time, that is, a predetermined reference value $T_{opt}$, a positive or negative modified value of the gain of the TES can be obtained, respectively (Processing block 508).

After the measurement of the seek time is completed, the selector 300 is switched to the velocity profile ROM 86 to decelerate the seek operation under the velocity control and then shift to track following mode (Processing block 507).

Then, to obtain a modified value of the gain of the TES during a seek operation toward the inner area of the optical disk 100, the selector 300 is switched again to the controller 200 for setting mode in which a constant-velocity profile is provided to the velocity profile generator 88 (Processing block 602). The controller 200 sets a predetermined profile in the velocity profile generator 88 (Processing block 603) or starts the seek operation for predetermined tracks toward the inner area of the optical disk 100 (Processing block 604). The timer 400 starts at the same time as the seek operation, and the controller 200 determines if the content of the track counter 84 has been decreased by 100 tracks (Decision block 605). If 100 tracks have been decreased, a seek time $T_i$ is measured by the timer 400 (Processing block 606). Then a modified value of the gain of the TES during the seek operation toward the inner area of the optical disk 100 is calculated by a predetermined equation so that if the seek time $T_i$ is less than or greater then a target time $T_{opt}$, a positive or a negative modified value of the gain of the TES can be obtained, respectively (Processing block 608). After the measurement of the seek time is completed, the selector 300 is switched to the velocity profile ROM 86 to shift to track following mode during the usual seek operation under the velocity control (Processing block 607).

After the completion of above operations, the controller 200 determines if the seek operation is toward the outer or the inner area (Decision block 701). If the seek operation is toward the outer area, the TES gain of the TES adjuster 74 is adjusted by the modified value of the TES gain during the seek operation toward the outer area, obtained from the above-mentioned measurement for the seek time (Processing block 702). If the seek operation is toward the inner area, the TES gain of the TES adjuster 74 is adjusted by the modified value of the TES gain during the seek operation toward the inner area (Processing block 703). Then the seek operation is started (Processing block 704) and, at the completion of the seek operation (Decision block 705), the value of the TES gain adjuster of the TES adjuster 74 is undone (Processing block 706).

FIG. 5(A) is a chart showing a waveform of TES obtained when the controller 200 provides a constant value, for example, Hex 10 to the velocity profile generator 88 to move a beam at a constant velocity. FIG. 5(A) indicates that a time required for moving the beam across 100 tracks is shorter than a predetermined reference value. Needless to say, the reference value is a theoretically derived and previously given value. The fact that the time required for moving the beam across 100 tracks is less than the expected value derived theoretically means that the velocity of the beam is higher than an expected value derived theoretically. Accordingly, if in such a case, control is performed so that the difference between a velocity signal detected from the TES and a signal with respect to a target velocity obtained from the velocity profile always becomes zero, an actual velocity, as shown in FIG. 5(C), always becomes higher than the target velocity provided by the velocity profile.

To improve this, in the embodiment, as shown in FIG. 5(B), the amplitude of the TES is increased. Since the larger amplitude of the TES causes a larger velocity detected value to be obtained from the differentiation of the TES, the difference between the velocity detected value and the velocity profile information decreases. A driving signal (driving current) used to move the beam is generated depending on the difference. This means that the above decreased difference causes the amplitude of the driving signal to be decreased. If the required time is, as shown in FIG. 5(A), shorter than the reference value, the beam moves at a velocity higher than the value derived theoretically. Accordingly, it is obvious that the decrease in the amplitude of the driving signal leads to proper modification. FIG. 5(D) shows that, as the result of such modification, the actual velocity of a beam accords with a value from the velocity profile.

FIG. 6(A) is a waveform chart showing that when the controller 200 provides a constant value, for example, Hex 10 to the velocity profile generator 88 to move a beam at a constant velocity, a time required for moving the beam across, for example, 100 tracks is longer than a predetermined reference value. The fact that the time required for moving the beam across 100 tracks is greater than the expected value derived theoretically means that the velocity of the beam is lower than an expected value derived theoretically. Accordingly, in such a case, if control is performed so that the difference between a velocity signal determined from the TES and a signal with respect to a target velocity obtained from the velocity profile always becomes zero, an actual velocity, as shown in FIG. 6(C), always becomes lower than the target velocity provided by the velocity profile.

To improve this, in the embodiment, as shown in FIG. 6(B), the amplitude of the TES is decreased. Since the smaller amplitude of the TES causes a smaller velocity detected value to be obtained from the differentiation of the TES, the difference between the velocity detected value and the velocity profile information increases. A driving signal (driving current) used to move the beam is generated depending on said difference. This means that the above increased difference causes the amplitude of the driving signal to be increased. If said required time is, as shown in FIG. 6(A), longer than the reference value, the beam moves at a velocity lower than the value derived theoretically. Accordingly, it is obvious that the increase in the amplitude of the driving signal leads to proper modification. FIG. 6(D) shows that, as the result of such modification, the actual velocity of a beam accords with a value from the velocity profile.

While the invention has been particularly described with reference to particular embodiments thereof, it will be understood by those skilled in the art that various other changes in detail may be made therein without departing from the spirit, scope, and teaching of the invention. In the preferred embodiment, a disk storage apparatus has been described as an optical disk storage apparatus. It will be appreciated that a disk storage apparatus may be a magnetic disk storage apparatus. With respect to an optical disk storage apparatus, the movement of a beam and the movement of a head have the same meaning.

Also, in the preferred embodiment, a velocity signal is detected based on the average of the amplitudes of a signal obtained from the differentiation of the TES, the quantity of feedback under velocity control has been corrected by adjusting the TES gain of the TES adjuster 74. However, it will be appreciated that if the velocity signal is, as described above, detected by a method other than differentiation of the TES, the quantity of feedback under the velocity control may be corrected by increasing or decreasing the gain of the detected velocity signal.

It will be appreciated also that instead of correcting the quantity of feedback, the output gain of the velocity profile generator 88 which is the control target may be corrected.

Also, in the preferred embodiment, a time required for moving a beam at a constant velocity has been measured. However, it will be appreciated that a time required for moving the beam at a non-constant velocity based on the velocity profile ROM may be measured.

What is claimed is:

1. A disk storage apparatus comprising:
   driving means for moving a head in the radial direction on a recording disk;
   velocity detecting means for detecting a velocity at which the head moves and for generating a tracking error signal;
   a velocity profile for storing information on a target velocity of the head;
   driving signal generating means for comparing the tracking error signal from the velocity detecting means with a signal from the velocity profile and outputting a driving signal to the driving means based on the result of the comparison; and
   control means for measuring a first time required for moving the head a predetermined distance at a predetermined velocity in the radial direction toward an inner area of the disk and, in a first comparison, comparing the measured first time with a first predetermined reference value, the control means modifying the driving signal by increasing or decreasing an amplitude of the tracking error signal at a time when the head moves toward the inner area based on the result of the first comparison, and further for measuring a second time required for moving the head a predetermined distance at a predetermined velocity in the radial direction toward an outer area of the disk, and in a second comparison, comparing the measured second time with a second predetermined reference value, the control means modifying the driving signal at a time when the head moves toward the outer area, based on the result of the second comparison.

2. A disk storage apparatus according to claim 1 wherein the control means provides the driving signal generating means with a constant value and measures a time required for moving the head at a predetermined velocity based on the constant value.

3. A disk storage apparatus having an optical head for projecting a light beam onto a recording surface of an optical disk, comprising:
   driving means for driving the optical head to move the beam in the radial direction of the disk; velocity detecting means for generating a tracking error signal which indicates the velocity of the beam in movement;
   a velocity profile for indicating information about a target velocity of the beam during a seek operation;
   driving signal generating means for comparing the tracking error signal from the velocity detecting means with a signal from the velocity profile; and
   control means for measuring a first time required for moving the beam a predetermined distance at a predetermined velocity in the radial direction toward an inner area of the disk and, in a first comparison, comparing the measured first time with a first predetermined reference value, the control means modifying the driving signal by increasing or decreasing an amplitude of the tracking error signal at a time when the beam moves toward the inner area based on the result of the first comparison, and further for measuring a second time required for moving the beam a predetermined distance at a predetermined velocity in the radial direction toward an outer area of the disk, and in a second comparison, comparing the measured second time with a second predetermined reference value, the control means modifying the driving signal at a time when the beam moves toward the outer area, based on the result of the second comparison.

4. The disk storage apparatus according to claim 3, wherein the control means provides the driving signal generating means with a constant value and measures a time required for moving the head at a predetermined velocity based on the constant value.

* * * * *